June 5, 1951        F. R. CHESTER        2,555,956
ADJUSTABLE MEASURING DEVICE
Filed Dec. 16, 1946
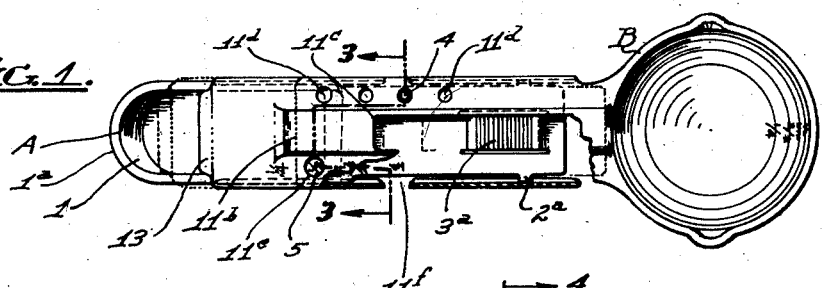
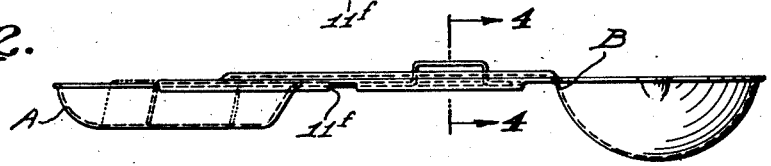
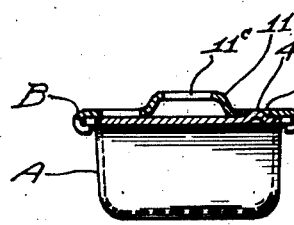
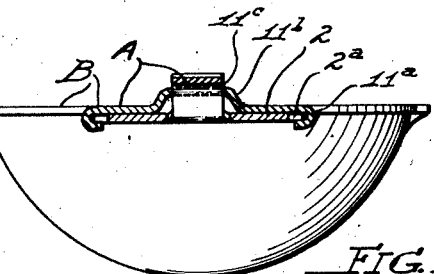
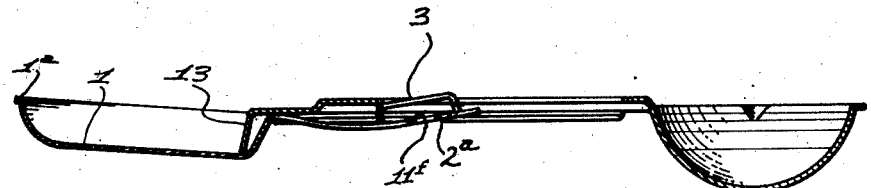
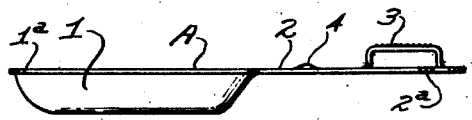
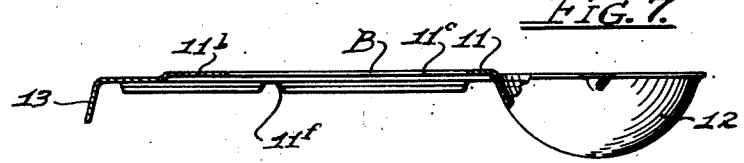
INVENTOR
F. R. CHESTER
BY William E. Hall
ATTORNEY Patented June 5, 1951

2,555,956

UNITED STATES PATENT OFFICE 2,555,956

ADJUSTABLE MEASURING DEVICE

Frank R. Chester, Santa Monica, Calif.

Application December 16, 1946, Serial No. 716,597

6 Claims. (Cl. 73—429)

My invention relates to an adjustable measuring device, commonly referred to as a measuring spoon, and particularly to improvements over my copending application for an Adjustable measuring device, Serial No. 582,725, filed March 14, 1945, now Patent 2,496,268.

One of the principal objects of this invention is to provide a device of this class which is particularly simple and economical to fabricate by stamping, and in which the several parts are so arranged and in which the metal may be drawn to make relatively to sufficiently deep receptacles without rupture or undue strain on the material.

Another important object of this invention is to provide a device of this class which may be readily and effectively gripped with one hand and easily adjusted by the same hand to vary the size of the receptacle to measure a predetermined amount of the ingredient.

An object also of this invention is to provide a device of this class whereby both liquids and solids of various kinds may be measured according to predetermined quantities.

A further important object of this invention is to provide a device of this class in which the two parts of which it is made may be easily separated so that they may be readily cleaned, but in which the parts may not be accidentally separated, a positive effort and additional movement being required beyond an extreme measuring position to bring about such separation.

With these and other objects in view, as will appear hereinafter, I have devised an adjustable measuring device for measuring various solid and liquid ingredients, the device having certain novel features of construction, combination, and arrangement of parts and portions, as will be hereinafter described in detail and particularly set forth in the appended claims, reference being had to the accompanying drawings and to the characters of reference thereon, which form a part of this application, in which:

Fig. 1 is a top view of my device in a preferred embodiment, showing certain portions thereof broken away and in section to facilitate the illustration, certain parts being shown by dotted lines in certain shifted positions;

Fig. 2 is a longitudinal side view thereof;

Fig. 3 is an enlarged transverse sectional view thereof, taken through 3—3 of Fig. 1;

Fig. 4 is an enlarged transverse sectional view thereof, taken through 4—4 of Fig. 2;

Fig. 5 is a longitudinal sectional view thereof, showing the positions of the members of the device immediately before separating the same;

Fig. 6 is a side view of one of the elements of the device; and,

Fig. 7 is a side view, partly in section, of the other element of the device.

As shown in the drawings, my adjustable measuring device is made of only two elements, namely, a receptacle member, designated A, and a handle member, designated B. Both of these elements are fabricated or stamped from relatively light gauge sheet metal.

The receptacle member A consists of a relatively long receptacle 1 at one end and a shank 2 extending longitudinally with respect to and from one end of the receptacle toward the opposite end of the member, as shown best in Fig. 6. The receptacle 1 is relatively shallow and is of uniform transverse cross-section at its intermediate portion, and is provided with a surrounding flange 1$^a$ at its upper portion, this flange being coplanar with the plane of the shank 2. The shank is slightly narrower in transverse width than the transverse distance across the flanges of the receptacle 1, but is provided near its end with laterally extended lugs or retaining portions 2$^a$, the distance across the outer ends of which is the same as the distance across the flanges 1$^a$ at the sides of the receptacle 1.

The element B consists of a shank 11, which is hereinafter referred to as a handle portion, and a liquid measuring receptacle 12 at one end of the shank 11 and a stop 13 at the opposite end.

The handle portion 11 is provided at its opposite lateral edges with downwardly and inwardly formed flanges 11$^a$ forming guides for the lateral portions of the flange 1$^a$ of the receptacle and also for the lugs or retaining portions 2$^a$, as shown in Figs. 1, 3, and 4, whereby the shank 2 may be retained by, but adjusted longitudinally with respect to, the handle portion of the element B. The stop 13, which consists of a plate portion which is bent downwardly from the handle portion 11, extends into and conforms in shape with the transverse cross-section of the receptacle 1. As the element A is adjusted longitudinally with respect to the element B, the stop 13 forms a partition wall for one end of the receptacle 1 for varying the capacity thereof to measure a predetermined amount of substances, such as powdered and granular solid material.

The handle 11 is reinforced longitudinally by a wide raised portion 11$^b$, and in this raised portion or rib is provided a longitudinal slot 11$^c$ through which is adapted to extend a raised portion 3, in the form of a loop extending longitudinally with respect to the shank and pressed upwardly therefrom. This portion or member 3 provides the means for adjusting or moving the element A, and the receptacle 1 thereof, with respect to the element B. The upper portion of the member 3 is transversely knurled or serrated, as indicated by 3a, to facilitate such manipulation. The forward and rear ends of the member or loop 3 engage the end portions of the slot 11c for limiting the ordinary movement of the elements A and B with respect to each other.

In the handle 11, and to one side of the reinforcing rib 11b, are provided uniformly spaced porforations 11d into one of which is adapted to extend a lug 4, in the form of a pimple, for determining the exact location of the stop 13 in the receptacle 1 for determining the particular measuring capacity of the receptacle. The pimple 4 is so shaped that it may be readily removed from one perforation 11d and inserted into another, but which is so shaped that the stop 13 may be noticeably and positively located in the desired position within the receptacle 1.

In the handle 11, and at the opposite side of the reinforcing rib 11b from the perforations 11d, is another larger perforation 11e through which may be seen the numerals or other designations 5, on the shank 2, for designating the capacity of the receptacle 1 determined by the lug or pimple 4 when located in a particular perforation 11d.

The element A may be removed or detached from the element B by merely gripping the handle 11 and moving the operating member 3 to its forward position, that is, beyond the position in which the pimple 4 is adapted to enter the perforation 11d, and then more forcefully depressing the member 3 so that the forward end thereof is forced below the upper portion of the reinforcing rib 11b. By moving the member 3 further a slight distance, the elements A and B are automatically separated. It will be here noted that the continuity of the retaining flanges 11a is broken at 11f, as shown in Figs. 1, 2, 3, 5, and 7, providing an open face through which the lug or lateral extension 2a may drop, or be forced, and thereby permitting the elements A and B to be separated without effort. Simultaneously with the removal of the lug or extension 2a from the opening 11f, the retaining flange 1a at the rear portion of the receptacle 1 is moved beyond the retaining flange at the forward end of the handle 11.

I wish it to be understood that I do not desire to be limited to the exact details of construction shown and described, for obvious modifications will occur to a person skilled in the art.

I claim:

1. In a device of the class described, a receptacle member comprising a receptacle having a shank extending therefrom, a handle member forming a handle for the receptacle member, said handle member being positioned over the top side of the shank and having means providing a slidable and adjustable support for the receptacle member, said handle member having a stop at one end extending into the receptacle to form an adjustable wall therein to vary the capacity of the receptacle, said handle member having a longitudinal slot, the shank having at its end which is disposed remote from said receptacle an offset loop extending through the slot whereby the offset portion may be shifted longitudinally in the slot while gripping the handle for adjusting the stop in the receptacle.

2. In a device of the class described, a receptacle member comprising a receptacle having a shank extending therefrom, a handle member forming a handle for the receptacle member, said handle member being positioned over the top side of the shank and having downwardly and inwardly bent flanges adjustably embracing the opposite edges of the receptacle member and providing a longitudinal guide therefor, said handle member having a stop at one end extending into the receptacle to form an adjustable wall therein to vary the capacity of the receptacle, said handle member having a longitudinal slot, the shank having at its end which is disposed remote from said receptacle an offset loop extending through the slot whereby the offset portion may be shifted longitudinally in the slot while gripping the handle for adjusting the stop in the receptacle.

3. In a device of the class described, a receptacle member comprising a receptacle having a shank extending therefrom, a handle member forming a handle for the receptacle member, said handle member having downwardly and inwardly bent flanges adjustably embracing the opposite edges of the receptacle member and providing a longitudinal guide therefor, said handle member having a stop at one end extending into the receptacle to form an adjustable wall therein to vary the capacity of the receptacle, the receptacle having laterally extending flanges at its upper portion, the end of the shank disposed remote from said receptacle having laterally extending lugs, said laterally extending flanges and lugs being capable of sliding in said guides, said guides having openings intermediate their ends through which said lugs may pass, the length of the portions of the handle member of the guides forwardly of said openings being less than the distance between the rear ends of the laterally extending flanges of said receptacle and the lugs of said shank.

4. In a device of the class described, a receptacle member comprising a receptacle having a shank extending therefrom, a handle member forming a handle for the receptacle member, said handle member having downwardly and inwardly bent flanges adjustably embracing the opposite edges of the receptacle member and providing a longitudinal guide therefor, the receptacle having laterally extending flanges at its upper portion, the end of the shank disposed remote from said receptacle having laterally extending lugs, said laterally extending flanges and lugs being capable of sliding in said guides, said guides having openings intermediate their ends through which said lugs may pass, the length of the portions of the handle member of the guides forwardly of said openings being less than the distance between the rear ends of the laterally extending flanges of said receptacle and the lugs of said shank.

5. In a device of the class described, a receptacle member comprising a receptacle having a shank extending therefrom, a handle member forming a handle for the receptacle member, the handle member having a handle portion supporting means thereon, the shank being longitudinally slidably mounted on the supporting means below the handle portion, said handle member having a stop extending into the receptacle to form an adjustable wall therein to vary the capacity of the receptacle, the handle portion having longitudinally spaced recesses and the shank having an upwardly struck lug capable of entering one of the recesses for locating the stop in a predetermined position within the receptacle, said handle portion having a hole through which stop-locating indicia on said shank may be seen.

6. In a device of the class described, an elongated open top receptacle having a flat shank extending from the upper portion of one end and positioned in alignment with the receptacle, and a stop positioned transversely in and movable longitudinally of the receptacle, said stop having a flat shank extending from one edge thereof and positioned flatwise against the shank of the receptacle, one of the shanks having a longitudinal slot and longitudinally spaced recesses, the other shank having a transverse extension longitudinally slidable in said slot and also provided with a lug adapted successively to extend into the recesses for locating the shanks, when shifted, longitudinally with respect to each other, the lug being resiliently held in the respective recesses by resiliency of one of the shanks.

FRANK R. CHESTER.

REFERENCES CITED

The following references are of record in the file of this patent:

UNITED STATES PATENTS

| Number | Name | Date |
|---|---|---|
| 291,950 | Stettheimer et al. | Jan. 15, 1884 |
| 808,967 | Arrowsmith | Jan. 2, 1906 |
| 2,165,642 | Mayer | July 11, 1939 |
| 2,389,530 | Miner | Nov. 20, 1945 |
| 2,396,943 | Frank | Mar. 19, 1946 |